United States Patent
Steinmetz et al.

(10) Patent No.: US 9,346,425 B2
(45) Date of Patent: May 24, 2016

(54) DUAL-MATERIAL ENERGY-ABSORPTION DEVICE WITH LOW THERMAL SENSITIVITY, FRONT END AND MOTOR VEHICLE INCORPORATING SUCH A DEVICE

(75) Inventors: Abla Steinmetz, Herimoncourt (FR); Laurent Droz Bartholet, Hericourt (FR); Vincent Gonin, Saint Cyr sur Loire (FR); Marie-Pierre Buron, Montenois (FR)

(73) Assignee: Faurecia Bloc Avant, Nanterre (FR)

( * ) Notice: Subject to any disclaimer, the term of this patent is extended or adjusted under 35 U.S.C. 154(b) by 5 days.

(21) Appl. No.: 13/988,916

(22) PCT Filed: Nov. 22, 2011

(86) PCT No.: PCT/EP2011/070707
§ 371 (c)(1),
(2), (4) Date: Jun. 28, 2013

(87) PCT Pub. No.: WO2012/069489
PCT Pub. Date: May 31, 2012

(65) Prior Publication Data
US 2014/0042775 A1    Feb. 13, 2014

(30) Foreign Application Priority Data

Nov. 22, 2010  (FR) ..................................... 10 59600

(51) Int. Cl.
*B60R 19/34* (2006.01)
*F16F 7/12* (2006.01)

(52) U.S. Cl.
CPC ................. *B60R 19/34* (2013.01); *F16F 7/121* (2013.01)

(58) Field of Classification Search
CPC ................................. B60R 19/34; F16F 7/121
USPC ....................................... 296/187.09; 293/133
See application file for complete search history.

(56) References Cited

U.S. PATENT DOCUMENTS

| | | | |
|---|---|---|---|
| 2002/0043809 A1* | 4/2002 | Vismara | 293/133 |
| 2010/0283289 A1* | 11/2010 | Challal et al. | 296/187.09 |
| 2012/0104778 A1* | 5/2012 | Mana et al. | 293/133 |

FOREIGN PATENT DOCUMENTS

| | | |
|---|---|---|
| EP | 0812674 A1 | 12/1997 |
| EP | 1035351 A1 | 9/2000 |

(Continued)

OTHER PUBLICATIONS

International Search Report and Written Opinion for corresponding PCT Application No. PCT/EP2011/070707 dated Dec. 12, 2011.

*Primary Examiner* — Glenn Dayoan
*Assistant Examiner* — Melissa A Black
(74) *Attorney, Agent, or Firm* — Thompson Coburn LLP

(57) ABSTRACT

The energy-absorption device (5) for a motor vehicle that comprises: a first energy-absorption member (50), in a first plastic material, provided so as to perfectly deform under the effect of an impact of given energy by absorbing a first portion of the energy of said impact; a second energy-absorption member (52), in a second plastic material different from the first plastic material, provided so as to plastically deform under the effect of said impact of given energy by absorbing a second portion of the energy of said impact; the first and second energy-absorption members (50, 52) being conformed so that the energy-absorption device (5) has a total intrusion-resisting force comprised between 75 and 200 kN, at any temperature comprised between −30° C. and 80° C.

23 Claims, 5 Drawing Sheets

(56) References Cited

FOREIGN PATENT DOCUMENTS

| EP | 1293389 | A1 | 3/2003 |
|---|---|---|---|
| FR | 2911831 | A1 | 8/2008 |
| FR | 2919566 | A1 | 2/2009 |
| GB | 2437499 | A | 10/2007 |
| WO | 2009/037787 | A1 | 3/2009 |

* cited by examiner

DUAL-MATERIAL ENERGY-ABSORPTION DEVICE WITH LOW THERMAL SENSITIVITY, FRONT END AND MOTOR VEHICLE INCORPORATING SUCH A DEVICE

The present invention generally relates to energy-absorption devices for motor vehicles.

For example medium intensity energy absorbers are known for impacts of the Danner type. These energy absorbers are typically interposed between the front end of the vehicle and the main stringers of the vehicle, or between the front end and the lower stringers of the vehicle. The lower stringers are also known under the name of « cradle extensions ».

Such shock absorbers are typically formed with tared metal boxes so as to plastically deform in the case of an impact with an intensity greater than a predetermined energy, by absorbing a portion of the impact energy. Such absorbers are for example described in FR 07 56 932.

They have a high mass and are of a complex structure, since they generally include several parts assembled to each other: a supporting sole, an aluminum foam block or a metal box, a deformable shell inside which is inserted the metal foam block or the metal box etc. Consequently, these absorbers are expensive, because their assembling requires a lot of time and sets into play a large number of parts.

Such absorbers operate satisfactorily, but their efficiency may further be improved.

Within this context, the invention aims at proposing a shock absorber which is lightweight, efficient and of reduced cost.

For this purpose, the invention according to a first aspect deals with an energy-absorption device comprising:
- a first energy-absorption member, in a first plastic material, provided so as to deform plastically under the effect of an impact of given energy by absorbing a first portion of the energy of said impact;
- a second energy-absorption member in a second plastic material different from the first plastic material, provided so as to plastically deform under the effect of said impact of given energy by absorbing a second portion of the energy of said impact;
- the first, second energy-absorption members being conformed so that the energy-absorption device has a total force for resisting intrusion comprised between 75 and 200 kN, and at any temperature comprised between −30° C. and 80° C.

The energy-absorption device may also have one or more of the characteristics below, considered individually or according to all technically possible combinations:
- the first energy-absorption member has at a temperature of 0° C. an intrusion-resisting force having a first given value, the first plastic material being selected so that the first energy-absorption member has an increasing intrusion-resisting force from the first value when the temperature decreases from 0° C.;
- the first energy-absorption member has at a temperature of 0° C. an intrusion-resisting force having a first given value, the first plastic material being selected so that the first energy-absorption member has a decreasing intrusion-resisting force from the first value when the temperature increases from 0° C.;
- the second energy-absorption member has at a temperature of 0° C. a intrusion-resisting force having a second given value, the second plastic material being selected so that the second energy-absorption member has a decreasing intrusion-resisting force from the second value when the temperature decreases from 0° C.;
- the second plastic material is selected so that the second energy-absorption member has an intrusion-resisting force of less than 20 kN at any temperature below −15° C.;
- the second energy-absorption member has at a temperature of 0° C. an intrusion-resisting force having a second given value, the second plastic material being selected so that the second energy-absorption member has an intrusion-resisting force comprised between said second value plus 20% and said second value minus 20%, at any temperature comprised between 0° C. and 80° C.;
- the first plastic material is a high ductility polymer selected from polyolefins, elastomers and blends thereof, polyamides or polyphenylene oxides;
- the second plastic material is a polymer selected from styrenic polymers, polycarbonates, polyamides, saturated polyesters, polyolefins, elastomers and blends thereof;
- the first energy-absorption member includes several walls defining together a housing into which the second energy-absorption member is engaged; and
- the first and second energy-absorption members are two areas of the energy-absorption device made by injection with each other, for example obtained by bi-injection or co-injection.

According to a second aspect, the invention deals with a front end of a motor vehicle, comprising a structural frame, a conformed shield for fitting the shape of a shield skin and positioned against the structural frame, and an energy-absorption device having the above characteristics, said shield comprising an upper crossbar, a lower crossbar, and vertical connecting beams connecting the upper and lower crossbars to each other, the first energy-absorption member and/or the second energy-absorption member being formed by an area of the shield.

According to a third aspect, the invention deals with a motor vehicle comprising:
- a chassis having main stringers and lower stringers;
- at least one energy-absorption device having the above features, the second energy-absorption member being positioned in the longitudinal extension of one of the main stringers and/or of one of the lower stringers.

Other features and advantages of the invention will become apparent from the detailed description thereof which is given below, as an indication and by no means as a limitation with reference to the appended drawings wherein.

Figure 1:
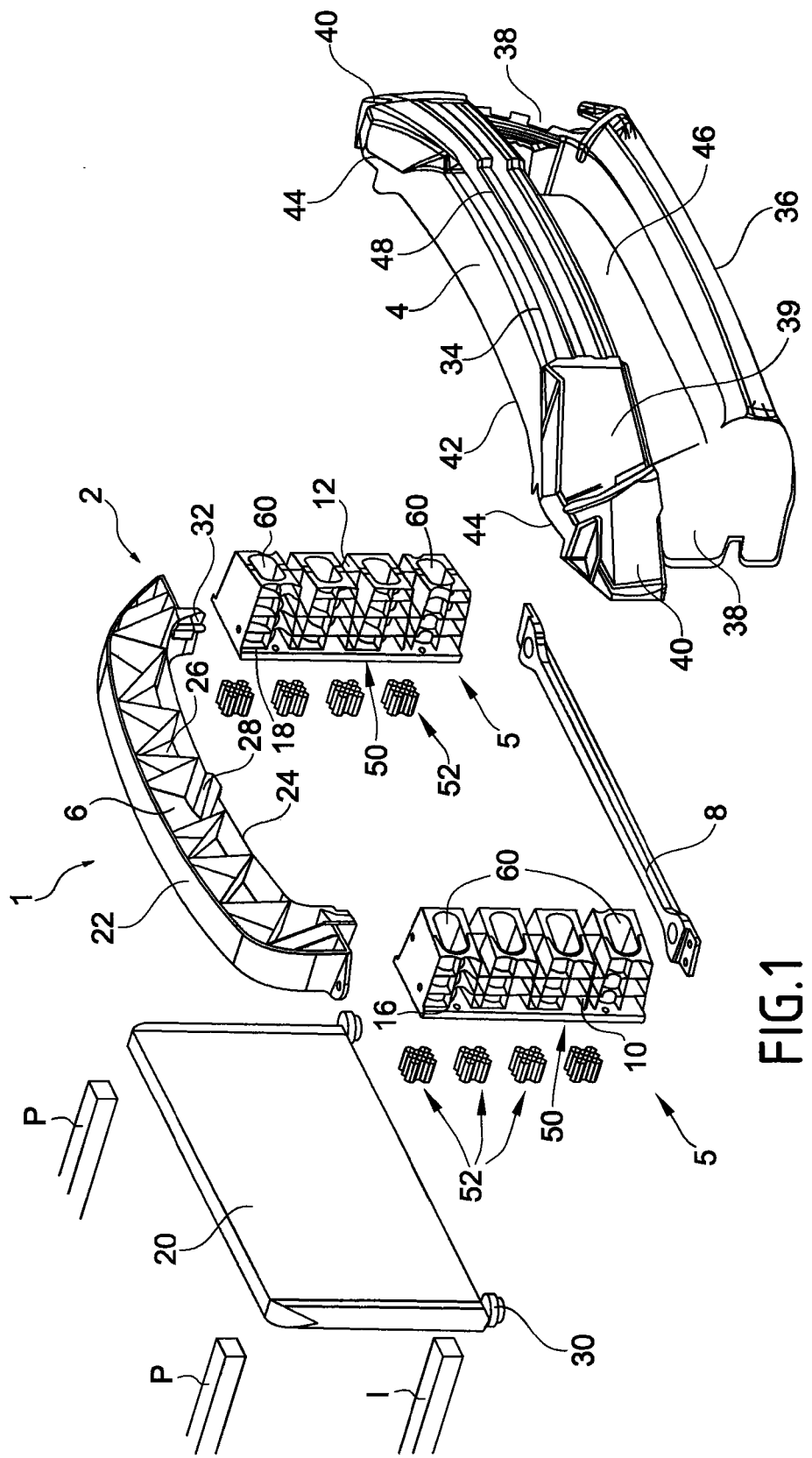
FIG. 1 is an exploded perspective view of a front end of a motor vehicle according to the invention, for an alternative embodiment in which the second energy-absorption member appears in the form of a honeycomb in plastic material.

The device for absorbing energy of the invention is intended to be integrated into a front end module 1 such as the one illustrated in FIG. 1.

The front end module 1 essentially comprises a structural frame 2, a shield 4, and two devices 5 for absorbing energy. The front end module 1 is intended to be attached on main stringers P of the vehicle, also called «stretchers», and on lower stringers I, also known under the name of «extensions of the cradle of the chassis». For the sake of simplicity, the structure of the shield 4 has not been entirely illustrated in FIG. 1.

The structural frame 2 participates in the rigidity of the body of the vehicle. It typically comprises an upper crossbar 6, a lower crossbar 8, and right 10 and left 12 vertical uprights each integrating one of the energy-absorption devices 5.

The right vertical upright, respectively the left vertical upright 12, of the structural frame 2 includes a supporting metal plate 16, 18 connecting on a same side of the vehicle, the end of a main stringer P to the end of the lower stringer I located on the same side.

In this embodiment, each energy-absorption device 5 is attached on a large face of the plate 16, 18 turned towards the front. The energy absorbing devices will be described later on.

The lower crossbar 8 of the structural frame connects both energy absorbing devices of the vertical uprights 10, 12 to each other.

The lower crossbar 8 has a section of a general rectangular shape. The central portion of the low crossbar 8 is thinned along the vertical direction, so that its upper face has a housing for receiving a cooling unit, generally indicated with reference 20. The cooling unit 20 for example includes a fan motor unit and a radiator. The lower crossbar 8 is advantageously made in plastic material. Alternatively, this crossbar may be metal and directly connected to the lower end of each of the lower stringers I, so as to increase its participation in the cohesion and rigidity of the body, in a rolling or crash situation.

The upper crossbar 6 of the structural frame 2 connects both energy absorbing devices 5 to each other. The upper crossbar 6 is of a general arc shape. The upper crossbar 6, as a latticed girder, includes an upper chord 22 and a lower chord 24 connected together through reinforcement ribs 26. The reinforcement ribs are positioned so as to form triangular lower boxes. The section of the upper crossbar 6 in the vertical middle plane, has a rhombus shape with an upper side essentially positioned horizontally and corresponding to the upper chord 22, a lower side corresponding to the lower chord 24, and the front and rear sides tilted towards the top and towards the rear of the vehicle. The upper crossbar 6 thus emerges towards the rear of the vertical plane defined by the lower crossbar 8 and the vertical uprights 10 and 12. The geometry disclosed above is shown as an example and forms a non-limiting exemplary embodiment.

The upper chord 22 of the upper crossbar 6 is adapted for cooperating with a body element of the vehicle and in particular with a hood of the latter. A lower face of the hood, oriented towards the inside of the vehicle will cover the upper chord 22, which is conformed for this purpose. A middle portion of the upper crossbar 6 has a housing 28 for receiving means for closing the hood intended to cooperate with conjugate closing means provided on the hood.

Means for maintaining the cooling unit 20 are provided on the lower chord 24 of the upper crossbar 6.

The shield 4 is positioned against the structural frame 2, towards the front of the latter; the shield 4 is for example a one-piece part made in plastic material. The shield 4 comprises an upper crossbar 34 and a lower crossbar 36 extending substantially horizontally and transversally, as well as two substantially vertical connecting beams 38 connecting the ends of the upper and lower crossbars to each other.

The general shape of the shield 4 is conformed so as to fit the shape of a shield skin (not shown) and intended to be attached on the front end 39 of the shield 4.

The shield 4 is intended to extend over the whole width of the front end of the motor vehicle, from one wing to the other of said vehicle.

The upper crossbar 34 is positioned substantially at right angles to the upper portions of the absorption devices 5. It extends between both absorption devices 5. According to an embodiment, the upper crossbar 34 further comprises extreme portions 40 extending transversally beyond the connecting beams on either side of the shield. These portions are intended to support headlights and shield skin elements or ancillary accessories.

The lower crossbar 36 is substantially positioned at right angles to the lower portions of the energy-absorption devices 5, and extends between these devices 5. The rear face 42 of the shield 4 includes two areas 44 for receiving the uprights 10 and 12. These areas 44 form two wide vertical rails and are at least partly delimited by the vertical connecting beams 38.

A central opening 46 is provided between the crossbars 34 and 36 and the connecting beams 38 so as to let the air pass towards the chassis of the motor vehicle.

As visible in FIG. 1, each of the two energy-absorption devices 5 comprises:
  a first energy-absorption member 50, in a first plastic material, provided so as to plastically deform under the effect of a given energy impact by absorbing a first portion of the energy on said impact;
  a second energy-absorption member 52, in a second plastic material different from the first plastic material, provided so as to plastically deform under the affect of said impact of energy given in a second portion of the energy of said impact.

The first, second energy-absorption members 50 and 52 are conformed so that the energy-absorption device has a total intrusion-resisting force comprised between 75 and 200 kN, at any temperature comprised between −30° C. and 80° C.

By «intrusion-resisting force» is meant here the minimum force to be applied to the energy-absorption member so as to obtain substantially complete plastic deformation of the energy-absorption member.

Figure 6:
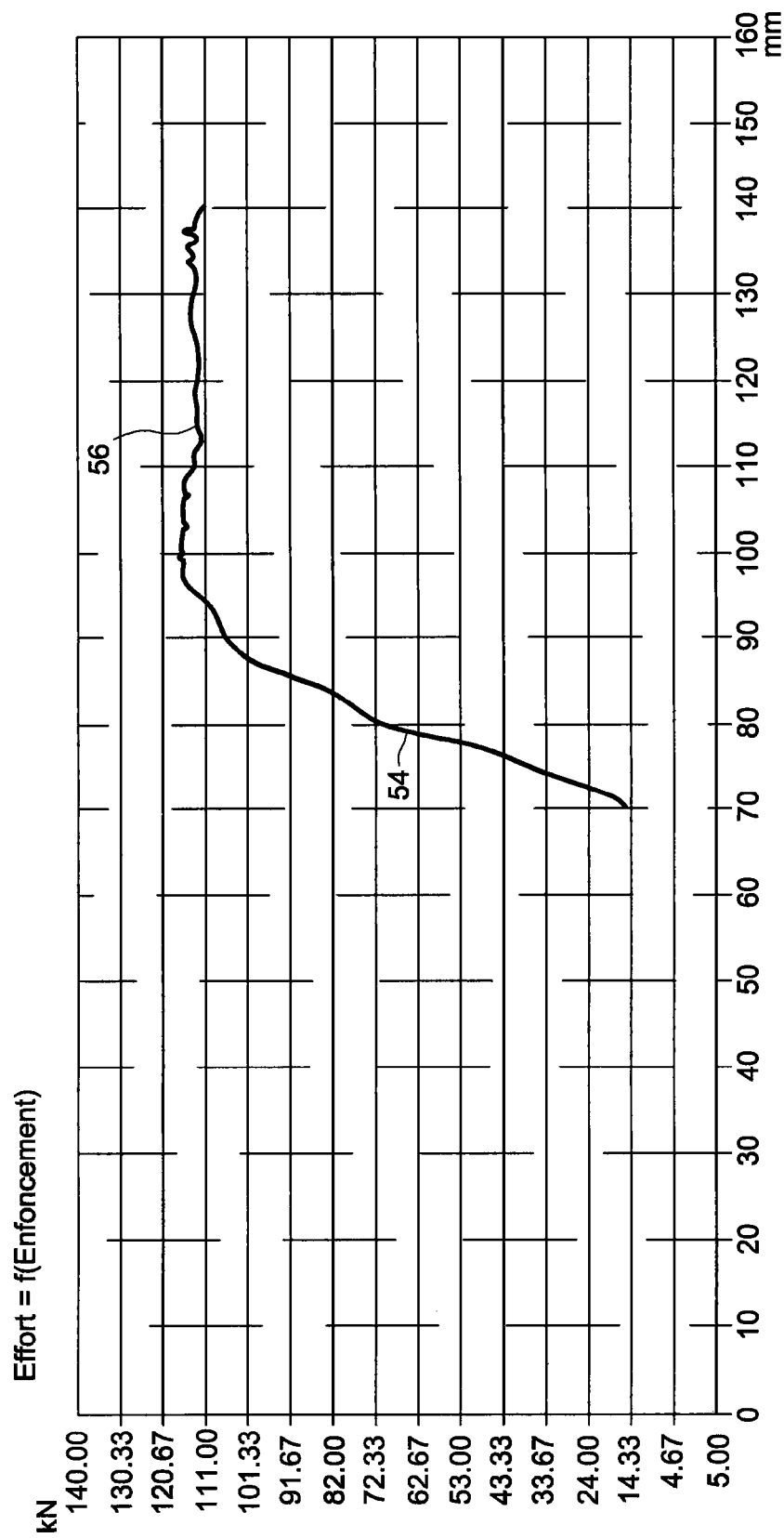
FIG. 6 is a graphic illustration of the «force/dent depth» curve of an energy-absorption member adapted to the Danner impact.

More specifically, as illustrated in FIG. 6, an energy-absorption member has a «force/dent depth» curve, first including a ramp 54 followed by a plateau 56.

In this curve, the force applied to the energy-absorption member is in ordinates and the dent depth of this member is in abscissae. FIG. 6 shows that the dent depth of the absorption member begins from a first force level at about 14 kN. The dent depth slowly increases when the applied force passes from the first force level to a second force level. From the second force level, here about 110 kN, the force remains substantially constant and the dent depth increases until its maximum value. The first portion of the curve, between 14 and 110 kN, corresponds to the ramp 54, the second portion from 110 kN, corresponds to the plateau 56. The intrusion-resisting force corresponds to the force at the plateau 56. In the example of FIG. 6, the intrusion-resisting force has a value of about 110 kN.

Each energy-absorption device of the invention is provided for absorbing repairability impacts, around 15 km/h, these impacts being known under the name of Danner impacts.

The energy-absorption device should have a total intrusion-resisting force which is as high as possible, in order to allow efficient dissipation of the energy in a reduced space.

Moreover, the total intrusion-resisting force of the device should be less than the total resisting force of the different routes of the motor vehicle, i.e. the main stringer and the extension for a Danner impact, so as not to damage the main stringer or the extension in the case of an impact. More specifically, the limiting force of the absorption device (intrusion-resisting force) should be less than or equal to the limiting buckling forces of each of the cumulated routes in order to preserve the structure at the rear of the device. Further, the distribution of the forces transmitted by the absorption device to each route should be such that the transmitted force does not exceed the limiting force of each of the routes independently (stretcher, extension). For example, a stretcher is generally tared between 100 and between 125 kN. An extension is generally tared between 30 kN and 50 kN. Thus, if the vehicle has a stretcher tared at 100 kN and an extension at 50 kN, the limiting force of the absorption device will be 150 kN, and the transmission of the force will be ensured for $\frac{2}{3}^{rd}$ by the stretcher and for $\frac{1}{3}^{rd}$ by the extension.

Thus, the intrusion-resisting force of the energy-absorption device should remain in a determined interval, for example from 75 to 200 kN, which is close but less than the resisting force for which the different routes of the vehicle are tared.

More specifically, the total intrusion-resisting force of the absorption device should remain in the interval indicated above at any temperature comprised between −30° C. and 80° C. This temperature range is dictated by the specification sheet of automobile manufacturers.

In order to remain in the interval of the total intrusion-resisting force, the absorption device of the invention includes two energy-absorption members made in two different plastic materials, the characteristics of which vary in a complementary way according to the temperature. The behavior of the first plastic material is illustrated in FIG. 3.

Figure 3:
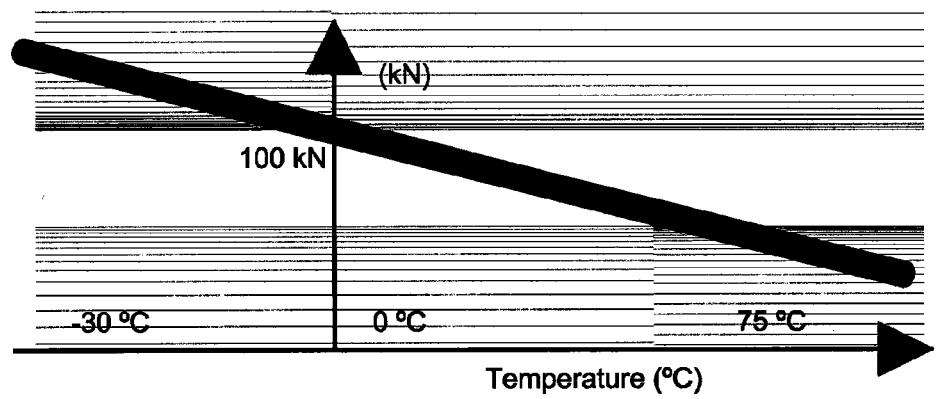
FIG. 3 is a graphic illustration of the intrusion-resisting force of an energy-absorption member consisting of the first plastic material versus temperature, the absorption member being tared for having a resisting force of 100 kN at 0° C.

The first energy-absorption member has, in the example illustrated in FIG. 3, a intrusion-resisting force of about 100 kN at a temperature of 0° C. The first plastic material is selected so that the intrusion-resisting force is increasing from 100 kN when the temperature decreases from 0° C. Conversely, the intrusion-resisting force is decreasing from 100 kN when the temperature increases from 0° C. Thus, the intrusion-resisting force of the first absorption member continuously decreases when the temperature increases.

The first plastic material is typically a high ductility polymer, selected from among polyolefins, elastomers and blends thereof, polyamides or polyphenylene oxides.

Figure 4:
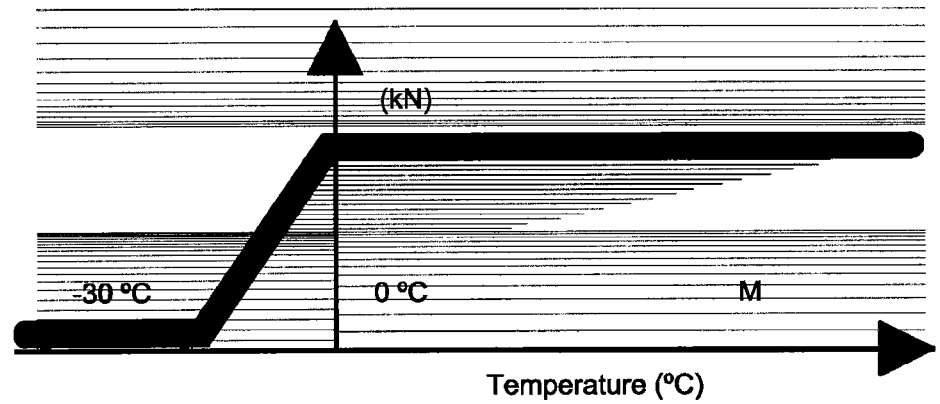
FIG. 4 is a same graphic illustration as the one of FIG. 3, for an energy-absorption member consisting of the second plastic material, the energy-absorption member being tared for having a resisting force of 100 kN at 0° C.

The behavior of the second material is illustrated in FIG. 4. The second energy-absorption member at a temperature of 0° C. has an intrusion-resisting force which is of about 100 kN in the example of FIG. 4. The second plastic material is selected so that the intrusion-resisting force of the second energy-absorption member decreases from 100 kN when the temperature decreases from 0° C. More specifically, the intrusion-resisting force rapidly decreases when the temperature decreases from 0° C. Indeed, the intrusion-resisting force is less than 20 kN at any temperature below −15° C. For example, the intrusion-resisting force is less than 10 kN at any temperature below −15° C., and even at any temperature below −10° C. Below −15° C., the resisting force is substantially constant, at a value of less than 10 kN.

The intrusion-resisting force is substantially constant for all the temperatures comprised between 0° C. and 80° C. More specifically, the intrusion-resisting force is comprised between the value at 0° C.+20% and the value at 0° C.−20%, at any temperature comprised between 0° C. and 80° C. Preferably the resisting force is comprised between the value at 0° C.+10% and the value at 0° C.−10%, and even more preferably between the value at 0° C.+5% and the value at 0° C.−5%.

The second plastic material is preferably a material which has a glassy transition temperature comprised between −20° C. and +10° C., preferably comprised between −10° C. and 0° C.

The second plastic material is typically a polymer selected from among styrenic polymers, polycarbonates, polyamides, saturated polyesters, polyolefins, elastomers and blends thereof, and may either be reinforced or not with fillers (glass, carbon, talc).

Figure 5:
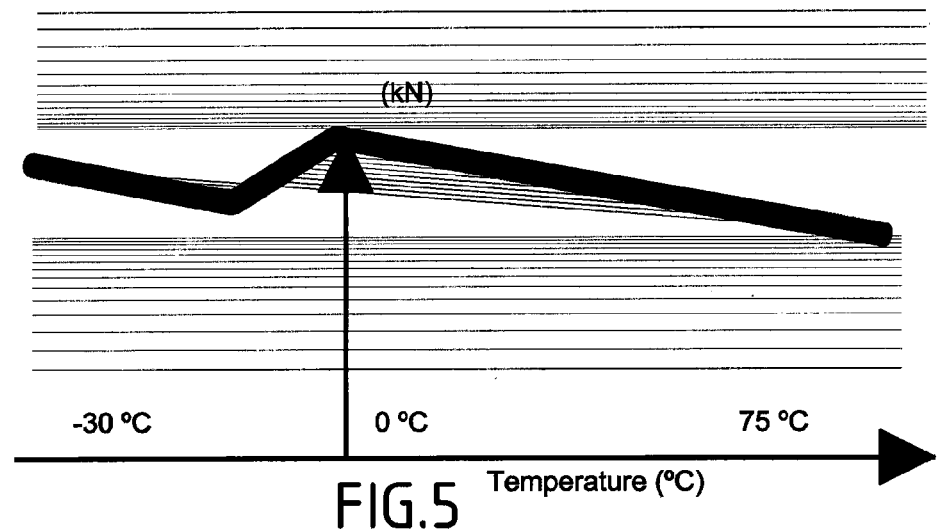
FIG. 5 is a graphic illustration similar to the one of FIGS. 3 and 4 for the device of the invention.

When the energy-absorption device includes an energy-absorption member of the type having the behavior of FIG. 3, and an energy-absorption member of the type having the behavior of FIG. 4, the device may for example have the behavior of FIG. 5. In FIG. 5, the intrusion-resisting force of such an energy-absorption device is illustrated versus temperature. The intrusion-resisting force is constantly in a range for example between 75 and 200 kN.

The intrusion-resisting force gradually decreases from −30° C. down to the temperature T1 from which the resisting force of the second member begins to increase. From this temperature up to 0° C., the intrusion-resisting force of the device increases under the effect of the strong increase of that of the second absorption member.

From 0° C. and up to 80° C., the resisting force of the device decreases slowly, because the first member has a decreasing resisting force but the second member has a substantially constant resisting force. The decrease in the resisting force of the complete device is slower than the decrease of the resisting force of the first member.

Figure 2:
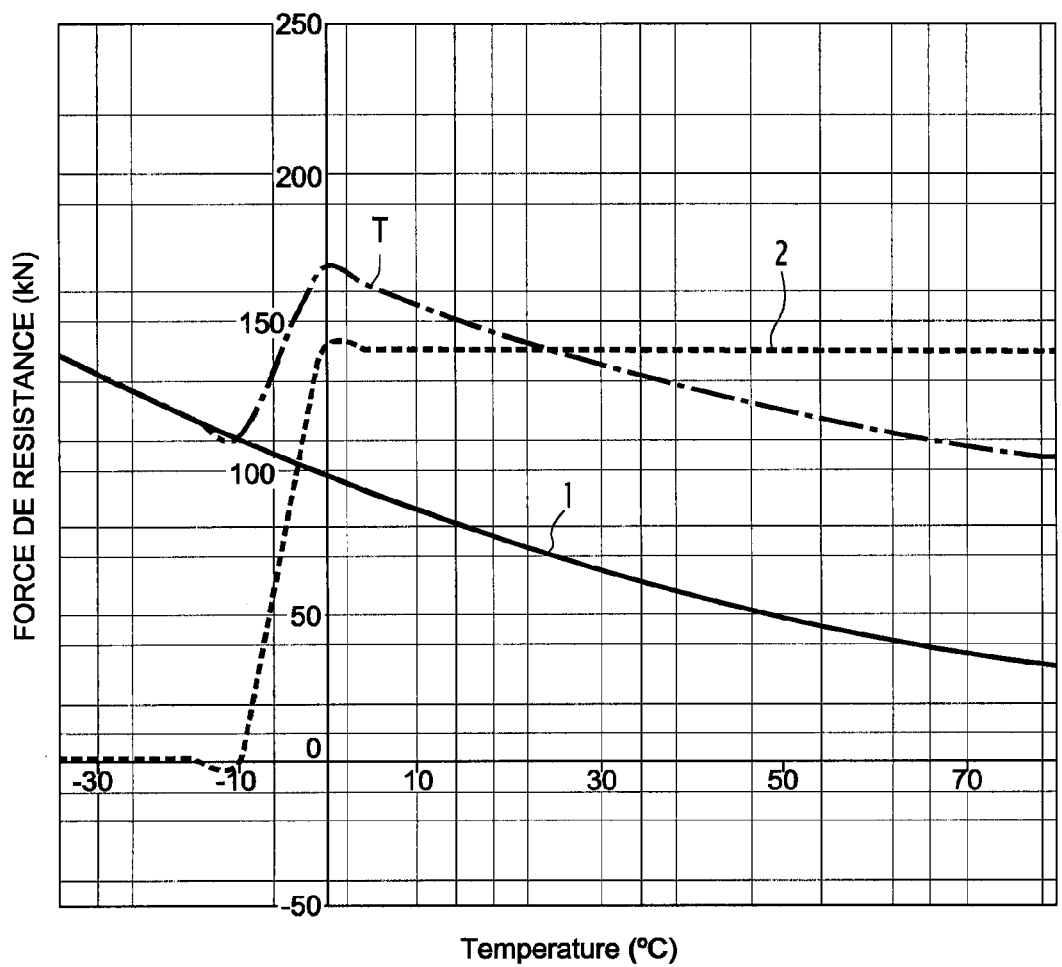
FIG. 2 is a graph indicating versus temperature, the intrusion-resisting force of the energy-absorption device of the invention (curve T), of the first energy-absorption member (curve 1) and of the second energy-absorption member (curve 2)

In FIG. 2, the resisting force of the absorption device 5 of FIG. 1 was illustrated versus temperature (curve T), as well as the respective resisting forces of the two absorption members of this device (first member: curve 1, second member: curve 2).

The curves 1, 2 and T have profiles similar to those of FIGS. 3, 4 and 5, respectively.

In the embodiment of FIG. 1, the first absorption member and the second absorption member are juxtaposed. More specifically, the first absorption member 50 is an injected part including several walls defining together at least one housing 60 into which the second energy-absorption member 52 is engaged. Thus, the second energy-absorption member 52 comprises at least one insert engaged inside the first energy-absorption member. For example, the first energy-absorption member may include several housings 60, the second energy-absorption member including several inserts, each inserted into a corresponding housing.

The insert is maintained in position in the housing by fastening with clips, screwing, heading, welding by friction or by laser, grooving etc. The first, second energy-absorption members cooperate so that the behavior of the energy-absorption device during the crushing phase is stable: no lateral spillage, nor any buckling or heading along the crushing axis.

The second energy-absorption member 52 may be a honeycomb part, each of the cells of the honeycomb having a central axis substantially parallel to the longitudinal axis of the vehicle. The second energy-absorption member may have any kind of other shapes.

The second energy-absorption members of the devices 5 are at least positioned in the longitudinal extension of the main stringers P, and also preferably in the longitudinal extension of the lower stringers I. Thus, in such a configuration, the front end module includes four members 52, each in the extension in one of the stringers.

Figure 7:
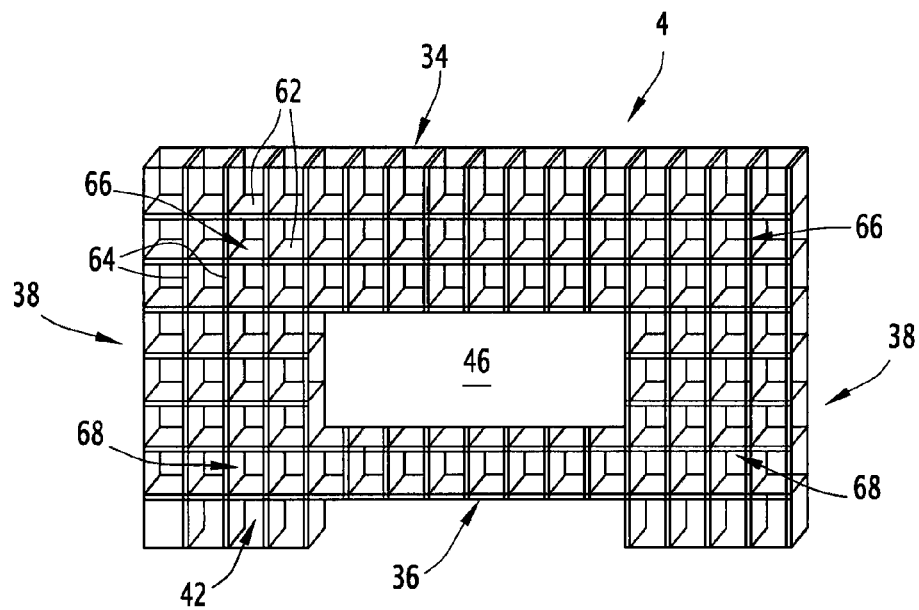
FIG. 7 is a schematic perspective view of a shield integrating an energy-absorption device according to a second embodiment of the invention.

In the embodiment of FIG. 7, the first and second energy-absorption members are made by injections into the shield 4. Both energy-absorption members may be bi-injected or co-injected. By « bi-injection » is meant an injection made in a mold including two injection orifices, each dedicated to one of the two materials. Thus there is practically no mixing between both materials. By « co-injection » is meant an injection into a mold including a single injection orifice, both materials being successively injected into the mold.

In the embodiment of FIG. 7, the frame 4 includes on its face 42 turned towards the rear, a plurality of stiffening ribs 62, 64. For example the ribs 62 are horizontal and the ribs 64 are vertical. The ribs 62, 64 form together closed cells towards the front of the vehicle and open cells towards the rear of the vehicle. Alternatively, certain cells may be closed towards the rear and open towards the front. Certain areas 66, 68 are made in the second material, these areas forming together the second energy-absorption member. For example, the areas 66 are longitudinally located in the extension of the main stringers P. The areas 68 are longitudinally located in the extension of the lower stringers I.

The remainder of the shield is made in the first material and forms the first energy-absorption member.

Figure 8:
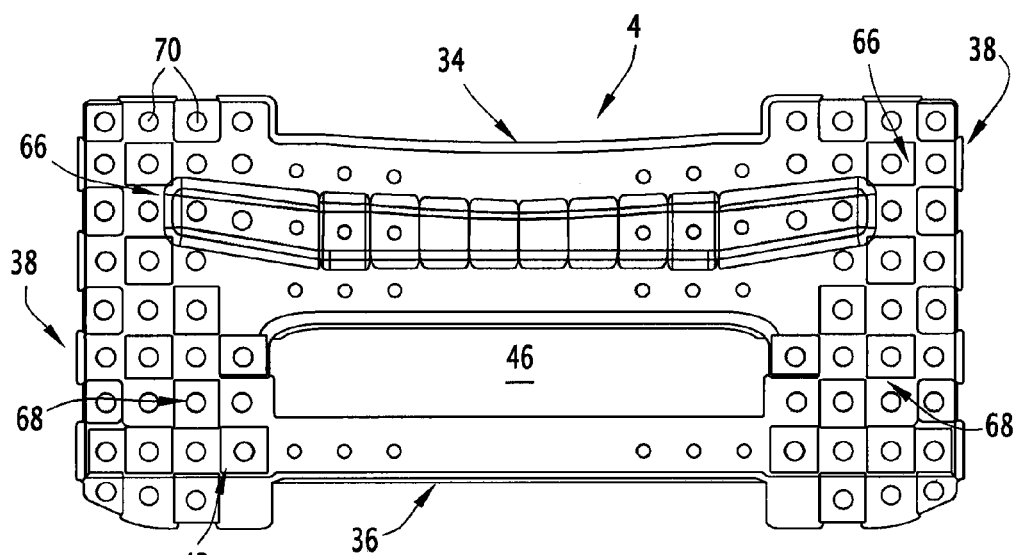
FIG. 8 is a schematic front view of a shield integrating an energy-absorption device according to a third embodiment of the invention.

As visible in FIG. 8, the bottom walls of some cells may include an opening 70.

Thus, the fact of making the energy device with a first energy-absorption member in a first plastic material, a second energy-absorption member in a second plastic material, the first, second energy-absorption members being conformed so that the energy-absorption device has a total intrusion-resisting force comprised between 75 and 200 kN, at any temperature comprised between −30° C. and 80° C., gives the possibility of obtaining an energy-absorption device which is highly efficient at any temperature and which is also lightweight and easy to make.

The selection of first and second plastic materials, the characteristics of which change in a complementary way versus temperature, gives the possibility of maintaining the total intrusion-resisting force of the absorption device in a narrow range, regardless of the temperature.

The energy-absorption members may conveniently be made by injections with each other. This manufacturing method is rapid and inexpensive.

The invention claimed is:

1. An energy-absorption device for a motor vehicle, the device (5) comprising:
 a first energy-absorption member (50), in a first plastic material, provided so as to plastically deform under the effect of an impact of given energy by absorbing a first portion of the energy of said shock;
 a second energy-absorption member (52), in a second plastic material different from the first plastic material, provided so as to plastically deform under the effect of an impact of given energy by absorbing a second portion of the energy of said shock;
 the first and second energy-absorption members (50, 52) being conformed so that the energy-absorption device (5) has a total intrusion-resisting force that is between 75 and 200 kN, throughout a temperature range of between −30° C. and 80° C.

2. The device according to claim 1, characterized in that the first energy-absorption member (50) has, at a temperature of 0° C., an intrusion-resisting force having a first given value, the first plastic material being selected so that the first energy-absorption member (50) has an increasing intrusion-resisting force from the first value when the temperature decreases from 0° C.

3. The device according to claim 1, characterized in that the first energy-absorption member (50) has, at a temperature of 0° C., an intrusion-resisting force having a first given value, the first plastic material being selected so that the first energy-absorption member (50) has a decreasing intrusion-resisting force from the first value when the temperature increases from 0° C.

4. The device according to claim 1, characterized in that the second energy-absorption member (52) has, at a temperature of 0° C., an intrusion-resisting force having a second given value, the second plastic material being selected so that the second energy-absorption member (52) has a decreasing intrusion-resisting force from the second value when the temperature decreases from 0° C.

5. The device according to claim 4, characterized in that the second plastic material is selected such that the second energy-absorption member (52) has an intrusion-resisting force of less than 20 kN at temperatures below −15° C.

6. The device according to claim 1, characterized in that the second energy-absorption member (52) has, at a temperature of 0° C., an intrusion-resisting force having a second given value, the second plastic material being selected so that the second energy-absorption member (52) has an intrusion-resisting force that is between said second value plus 20% and said second value minus 20%, throughout a temperature range of between 0° C. and 80° C.

7. The device according to claim 1, characterized in that the first plastic material is a high ductility polymer selected from polyolefins, elastomers and blends thereof, polyamides or polyphenylene oxides.

8. The device according to claim 1, characterized in that the second plastic material is a polymer selected from styrenic polymers, polycarbonates, polyamides, saturated polyesters, polyolefins, elastomers and blends thereof.

9. The device according to claim 1, characterized in that the first energy-absorption member (50) includes walls defining together a housing (60) into which the second energy-absorption member (52) is engaged.

10. The energy-absorption device of claim 1, wherein the first energy-absorption member has a first characteristic curve of intrusion-resisting force according to the temperature, and the second energy-absorption member has a second characteristic curve of intrusion-resisting force according to the temperature, wherein the first and the second plastic materials are selected so that the intrusion-resisting forces of the first and second energy-absorption members evolve in a complementary manner according to the temperature.

11. A motor vehicle front end comprising:
 a structural frame (2);
 a shield (4) conformed so as to fit the shape of a shield skin and positioned against the structural frame (2), wherein said shield (4) comprises an upper crossbar (34), a lower crossbar (36), and vertical connecting beams (38) connecting the upper and lower crossbars (34, 36) with each other; and an energy-absorption device (5) that comprises:
- a first energy-absorption member (50), in a first plastic material, provided so as to plastically deform under the effect of an impact of given energy by absorbing a first portion of the energy of said shock; and
- a second energy-absorption member (52), in a second plastic material different from the first plastic material, provided so as to plastically deform under the effect of an impact of given energy by absorbing a second portion of the energy of said shock;

wherein the first and second energy-absorption members (50, 52) are conformed so that the energy-absorption device (5) has a total intrusion-resisting force that is between 75 and 200 IN, throughout a temperature range of between −30° C. and 80° C., and wherein the first energy-absorption member (50), the second energy-absorption member (52), or both are formed by an area of the shield (4).

12. A motor vehicle comprising:
- a chassis having main stringers (P) and lower stringers (I); and
- at least one energy-absorption device (5) that comprises:
  - a first energy-absorption member (50), in a first plastic material, provided so as to plastically deform under the effect of an impact of given energy by absorbing a first portion of the energy of said shock; and
  - a second energy-absorption member (52), in a second plastic material different from the first plastic material, provided so as to plastically deform under the effect of an impact of given energy by absorbing a second portion of the energy of said shock;

wherein the first and second energy-absorption members (50, 52) are conformed so that the energy-absorption device (5) has a total intrusion-resisting force that is between 75 and 200 kN, throughout a temperature range of between −30° C. and 80° C., and wherein the second energy-absorption member (52) is positioned in the longitudinal extension of one of the main stringers (P), one of the lower stringers (I), or of one of the main stringers (P) and one of the lower stringers (I).

13. The motor vehicle front end according to claim 11, characterized in that:
- the first energy-absorption member (50) has, at a temperature of 0° C., an intrusion-resisting force having a first given value, the first plastic material being selected so that the first energy-absorption member (50) has an increasing intrusion-resisting force from the first value when the temperature decreases from 0° C. and a decreasing intrusion-resisting force from the first value when the temperature increases from 0° C.; and
- the second energy-absorption member (52) has, at a temperature of 0° C., an intrusion-resisting force having a second given value, the second plastic material being selected so that the second energy-absorption member (52) has a decreasing intrusion-resisting force from the second value when the temperature decreases from 0° C.

14. The motor vehicle front end according to claim 13, characterized in that the second plastic material is selected such that the second energy-absorption member (52) has an intrusion-resisting force of less than 20 kN at temperatures below −15° C.

15. The motor vehicle front end according to claim 13, characterized in that the second energy-absorption member (52) has an intrusion-resisting force that is between said second value plus 20% and said second value minus 20%, throughout a temperature range of between 0° C. and 80° C.

16. The motor vehicle front end according to claim 15, characterized in that:
- the first plastic material is a high ductility polymer selected from polyolefins, elastomers and blends thereof, polyamides or polyphenylene oxides; and
- the second plastic material is a polymer selected from styrenic polymers, polycarbonates, polyamides, saturated polyesters, polyolefins, elastomers and blends thereof.

17. The motor vehicle front end according to claim 16, characterized in that the first energy-absorption member (50) includes walls defining together a housing (60) into which the second energy-absorption member (52) is engaged.

18. The motor vehicle according to claim 12, characterized in that:
- the first energy-absorption member (50) has, at a temperature of 0° C., an intrusion-resisting force having a first given value, the first plastic material being selected so that the first energy-absorption member (50) has an increasing intrusion-resisting force from the first value when the temperature decreases from 0° C. and a decreasing intrusion-resisting force from the first value when the temperature increases from 0° C.; and
- the second energy-absorption member (52) has, at a temperature of 0° C., an intrusion-resisting force having a second given value, the second plastic material being selected so that the second energy-absorption member (52) has a decreasing intrusion-resisting force from the second value when the temperature decreases from 0° C.

19. The motor vehicle according to claim 18, characterized in that the second plastic material is selected such that the second energy-absorption member (52) has an intrusion-resisting force of less than 20 kN at temperatures below −15° C.

20. The motor vehicle according to claim 19, characterized in that the second energy-absorption member (52) has an intrusion-resisting force that is between said second value plus 20% and said second value minus 20%, throughout a temperature range of between 0° C. and 80° C.

21. The motor vehicle according to claim 20, characterized in that:
- the first plastic material is a high ductility polymer selected from polyolefins, elastomers and blends thereof, polyamides or polyphenylene oxides; and
- the second plastic material is a polymer selected from styrenic polymers, polycarbonates, polyamides, saturated polyesters, polyolefins, elastomers and blends thereof.

22. The motor vehicle according to claim 21, characterized in that the first energy-absorption member (50) includes walls defining together a housing (60) into which the second energy-absorption member (52) is engaged.

23. The motor vehicle of claim 22, further comprising:
- a structural frame (2); and
- a shield (4) conformed so as to fit the shape of a shield skin and positioned against the structural frame (2), wherein said shield (4) comprises an upper crossbar (34), a lower crossbar (36), and vertical connecting beams (38) connecting the upper and lower crossbars (34, 36) with each other, and wherein the first energy-absorption member (50), the second energy-absorption member (52), or both are formed by an area of the shield (4).

\* \* \* \* \*